United States Patent
Duron et al.

(10) Patent No.: US 7,136,778 B2
(45) Date of Patent: Nov. 14, 2006

(54) METHOD FOR NON-INVASIVE PERFORMANCE MONITORING AND TUNING

(75) Inventors: Mike Conrad Duron, Pflugerville, TX (US); Mark David McLaughlin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 10/932,700

(22) Filed: Sep. 2, 2004

(65) Prior Publication Data

US 2006/0047475 A1    Mar. 2, 2006

(51) Int. Cl.
*G06F 19/00* (2006.01)

(52) U.S. Cl. ............ 702/182; 702/186; 714/724; 714/727; 714/30; 714/47

(58) Field of Classification Search ............... None
See application file for complete search history.

(56) References Cited

U.S. PATENT DOCUMENTS

| | | | | |
|---|---|---|---|---|
| 6,282,674 | B1 * | 8/2001 | Patel et al. ................ | 714/30 |
| 6,823,375 | B1 * | 11/2004 | Tran et al. ................ | 709/220 |
| 6,832,342 | B1 * | 12/2004 | Fields et al. ............... | 714/45 |
| 6,944,854 | B1 * | 9/2005 | Kehne et al. ............... | 717/168 |
| 6,961,785 | B1 * | 11/2005 | Arndt et al. ............... | 710/9 |
| 2002/0124062 | A1 * | 9/2002 | Lee et al. ................ | 709/220 |
| 2004/0210793 | A1 * | 10/2004 | Chokshi et al. ............. | 714/5 |
| 2004/0260981 | A1 * | 12/2004 | Kitamorn et al. ............. | 714/43 |
| 2005/0081126 | A1 * | 4/2005 | Kulkarni et al. ............. | 714/56 |
| 2005/0144533 | A1 * | 6/2005 | LeVangia et al. ............ | 714/43 |
| 2005/0154929 | A1 * | 7/2005 | Ahrens et al. .............. | 713/300 |
| 2005/0160314 | A1 * | 7/2005 | Ahrens et al. .............. | 714/13 |
| 2005/0216796 | A1 * | 9/2005 | Carlos .................... | 714/699 |

OTHER PUBLICATIONS

Not Assigned, Duron et al., Method for Self-Diagnosing Remote I/O Enclosures with Enhanced FRU Callouts.
Not Assigned, Duron et al., Method to Use an Alternate I/O Debug Path.

* cited by examiner

*Primary Examiner*—Patrick J. Assouad
(74) *Attorney, Agent, or Firm*—Duke W. Yee; Thomas E. Tyson; Mary Adams-Moe

(57) ABSTRACT

A non-invasive method, system, and computer product for monitoring I/O performance without using the RIO bus. When executing a performance benchmark run in a remote I/O drawer, the system logs into a bulk power controller, wherein the bulk power controller provides a communications path between the data processing system and the I/O drawer, and wherein the communications path allows the data processing system to access chip register information on the I/O drawer without using a RIO link. Using the communications path, the system may monitor I/O performance and obtain chip register information. The system may further increase performance by using software to detect a load imbalance. Through the communications path, the software is able to dynamically balance the load by changing the chip register settings to allow the initialization registers to handle the load more efficiently.

32 Claims, 2 Drawing Sheets

METHOD FOR NON-INVASIVE PERFORMANCE MONITORING AND TUNING

CROSS REFERENCE TO RELATED APPLICATIONS

The present invention is related to the following applications entitled "Method for Self-Diagnosing Remote I/O Enclosures with Enhanced FRU Callouts", Ser. No. 10/932,706, filed on Sep. 2, 2004; and "Method to Use an Alternate I/O Debug Path", Ser. No. 10/932,704, filed on Sep. 2, 2004. All of the above related applications are assigned to the same assignee, and incorporated herein by reference.

BACKGROUND OF THE INVENTION

1. Technical Field

The present invention relates generally to an improved data processing system, and in particular to a method, system, and computer product for performance monitoring in a data processing system. Still more particularly, the present invention provides a method, system, and computer product for monitoring input/output (I/O) performance without using the remote input/output (RIO) cables.

2. Description of Related Art

A multiprocessor data processing system is a data processing system that contains multiple central processing units. This type of system allows for logical partitioning in which a single multiprocessor data partitioning in which a single multiprocessor data processing system may run as if the system were two or more independent systems. In such a system, each logical partition represents a division of resources in the system and operates as an independent logical system. Each of these partitions is logical because the division of resources may be physical or virtual. For example, a multiprocessor data processing system may be partitioned into multiple independent servers, in which each partition has its own processors, main storage, and input/output devices.

Many systems include multiple remote input/output (RIO) subsystems in which each subsystem includes a bridge or some other interface to connect the subsystem with other portions of the data processing system through a primary or main input/output hub. Each of these remote I/O subsystems is also referred to as a "RIO drawer". Each of these RIO drawers may include peripheral components, such as, for example, hard disk drives, tape drives, or graphics adapters.

RIO drawers are typically physically separated from the processors and memory components of the computer. The RIO drawers and their components are connected to the main computer using RIO network cables which allow the I/O devices contained within the RIO drawers to function with the remainder of the computer as if they were on the system bus.

Performance monitoring is often used in optimizing the performance of a system. A performance monitor is generally regarded as a facility incorporated into a processor to assist in analyzing selected characteristics of a system by determining a machine's state at a particular point in time. Some systems, such as the IBM eServer pSeries Regatta 690 and the IBM eServer pSeries and iSeries Squadrons systems, products of International Business Machines Corporation in Armonk, N.Y., use RIO links to connect the central electronics complex (CEC) to a host of I/O devices. These systems do not have JTAG access to the RIO drawers, and thus these RIO links provide the only communication paths from the processors in the CEC to the I/O drawers. Consequently, all performance monitoring commands must go through the RIO cables. However, sending performance monitoring commands through the RIO cables adds additional traffic to the RIO cables and can affect system performance.

Therefore, it would be advantageous to have a non-invasive method for monitoring I/O performance without using the RIO bus.

SUMMARY OF THE INVENTION

The present invention provides a non-invasive method, system, and computer product for monitoring I/O performance without using the RIO bus. When executing a performance benchmark run in a remote I/O drawer, the system logs into a bulk power controller, wherein the bulk power controller provides a communications path between the data processing system and the I/O drawer, and wherein the communications path allows the data processing system to access chip register information on the I/O drawer without using a RIO link. Using the communications path, the system may monitor I/O performance and obtain chip register information. The system may further increase performance by using software to detect a load imbalance. Through the communications path, the software is able to dynamically balance the load by changing the chip register settings to allow the initialization registers to handle the load more efficiently.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
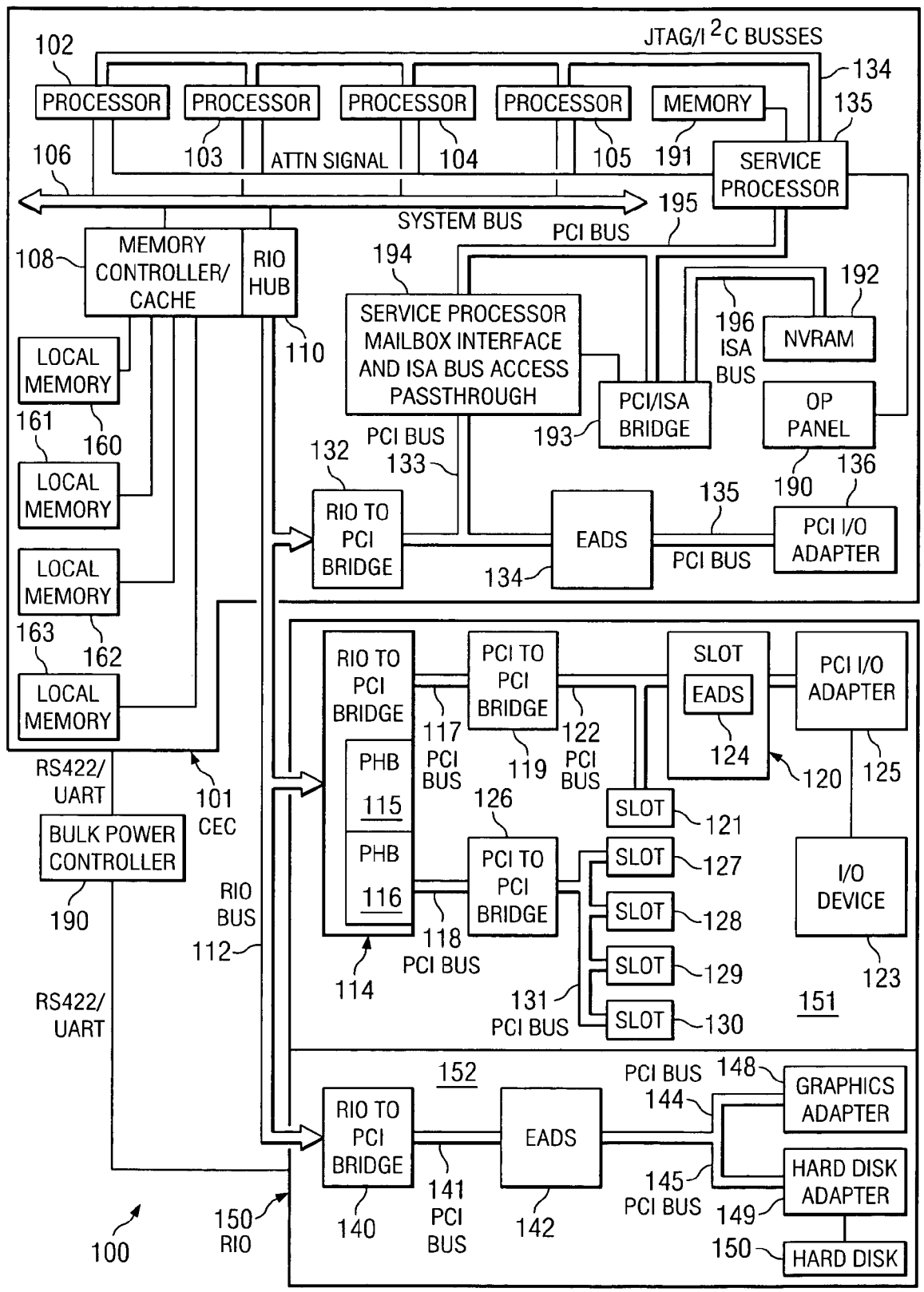
FIG. 1 is a block diagram of an exemplary data processing system in which the present invention may be implemented in accordance with the present invention.

With reference now to the figures, and in particular with reference to FIG. 1, a block diagram of a data processing system in which the present invention may be implemented is depicted. Data processing system 100 includes a central electronic complex 101 which includes logically partitioned hardware. CEC 101 includes a plurality of processors 102, 103, 104, and 105 connected to system bus 106. Alternatively, a single processor system may be employed. Also connected to system bus 106 is memory controller/cache 108, which provides an interface to a plurality of local memories 160–163. RIO Hub 110 is connected to system bus 106 and provides an interface to RIO bus 112. Memory controller/cache 108 and RIO Hub 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI slots, to which PCI I/O adapters may be coupled, such as slots 120, 121, and 127–130, graphics adapter 148, and hard disk adapter 149 may each be assigned to different logical partitions. In this case, graphics adapter 148 provides a connection for a display device (not shown), while hard disk adapter 149 provides a connection to control hard disk 150.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance, also called an image, of the AIX operating system may be executing within partition P2, and a Windows 2000 operating system may be operating within logical partition P3. Windows 2000 is a product and trademark of Microsoft Corporation of Redmond, Wash.

Data processing system 100 includes RIO enclosure 150, which includes a plurality of I/O drawers 151 and 152 connected to RIO bus 112. RIO to PCI bridge 114 in I/O drawer 151 is connected to RIO bus 112 and provides an interface to PCI bus 117 and PCI bus 118. RIO to PCI bridge 114 includes one or more PCI host bridges (PHB), such as PHB 115 and PHB 116. Each PHB is coupled to a PCI to PCI bridge through a PCI bus. For example, PHB 115 is coupled to PCI to PCI bridge 119 through PCI bus 117. PHB 116 is coupled to PCI to PCI bridge 126 through PCI bus 118. Each PCI to PCI bridge is coupled to one or more PCI slots. For example, PCI to PCI bridge 119 is coupled to slot 120 and slot 121 using PCI bus 122. Although only two slots are shown, typically either four or eight slots are supported by each PHB. PCI to PCI bridge 126 is coupled to slots 127–130 using PCI bus 131.

Each slot includes an EADS chip to which a PCI I/O adapter may be attached. For example, slot 120 includes EADS 124. An I/O adapter may be inserted into a slot and thus coupled to an EADS. For example, I/O adapter 125 is inserted into slot 120 and coupled to EADS 124. An I/O device may be coupled to data processing system 100 utilizing an I/O adapter. For example, as depicted, I/O device 123 is coupled to I/O adapter 125.

A memory mapped graphics adapter 148 may be connected to RIO bus 112 through PCI bus 144, EADS 142, PCI bus 141, and RIO to PCI bridge 140. A hard disk 150 may be coupled to hard disk adapter 149 which is connected to PCI bus 145. In turn, this bus is connected to EADS 142, which is connected to RIO to PCI Bridge 140 by PCI bus 141.

A RIO to PCI bridge 132 provides an interface for a PCI bus 133 to connect to RIO bus 112. PCI I/O adapter 136 is connected to EADS 134 by PCI bus 135. EADS 132 is connected to PCI bus 133. This PCI bus also connects RIO to PCI bridge 132 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 102–105 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 102, 103, 104, and 105 are connected together to an interrupt input signal of the service processor. The service processor 135 has its own local memory 191, and has access to the hardware OP-panel 190.

When data processing system 100 is initially powered up, service processor 135 uses the JTAG/scan I$^2$C busses 134 to interrogate the system (host) processors 102–105, memory controller/cache 108, and RIO Hub 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 102–105, memory controller/cache 108, and RIO Hub 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 102–105 for execution of the code loaded into host memory 160–163. While the host processors 102–105 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 102–105, local memories 160–163, and RIO Hub 110. Service processor 135 is responsible for saving and reporting error information related to all the monitored items in data processing system 100.

Data processing system 100 is powered by bulk power controller (BPC) 190, which provides power to various components in the data processing system, such as, for example, processors and I/O enclosures. For instance, bulk power controller 190 distributes power to CEC 101, service processor 135, and RIO enclosure 150 using I$^2$C paths. Each I$^2$C path is primarily used for power control.

Data processing system 100 may be implemented using various commercially available computer systems. For example, data processing system 100 may be implemented using IBM eServer pseries Regatta 690 system or the IBM eServer pSeries Squadron system, both products available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

As mentioned previously, performance monitoring is used in optimizing the performance of a system. In systems such as the IBM eServer pseries Regatta 690 server and the IBM eServer pSeries and iSeries Squadrons servers, which only use RIO cables to connect the processors in the CEC to the I/O drawers, all performance monitoring commands must go through these RIO cables. The mechanism of the present invention allows for accessing the chip performance registers on the RIO drawers by providing an alternative path to the drawers. This alternative path provides systems that only use RIO links to access the I/O drawers with another means of accessing the chip performance registers in the I/O drawers. In this manner, the alternative path provides the system with a non-invasive method of monitoring I/O performance without creating additional traffic on the RIO links.

The bulk power controller is used to provide the alternate path to the I/O drawers. The path provided by the bulk power controller interface allows access to the chip performance registers on the I/O drawers, including the JTAG-accessible registers. A tester may use the system itself or a separate workstation to login to the bulk power controller. The tester may then use the alternative path provided by the bulk power controller to access chip performance registers on the I/O drawers. Commands are sent to the bulk power controller using an ethernet connection. These commands are forwarded to the DCA in the I/O drawer using the RS422 connection from the bulk power controller and the DCA. The DCA has an I²C path connected to the chips on the I/O drawer, which is used to read and write to the chip registers. Thus, transactions sent to the I/O drawers using the alternate path do not affect system performance, as they are not sent using the same bus.

In addition, certain initialization registers will handle different kinds of load more efficiently based on settings in the registers. With this in mind, to gain even further performance, software may be written to monitor I/O performance for a load imbalance. The load imbalance may be at the RIO link level, PHB level, or I/O slot level. The software may dynamically balance the load by using the alternate path of the present invention to change the chip register settings, thus increasing system performance. This dynamic tuning and load balancing may be performed during runtime. Since the monitoring and tuning is non-invasive (i.e., using the alternative path to read registers in the I/O area to determine the performance characteristics does not use any bandwidth on the RIO link path) the performance benchmark programs may then use all of the RIO traffic.

Figure 2:
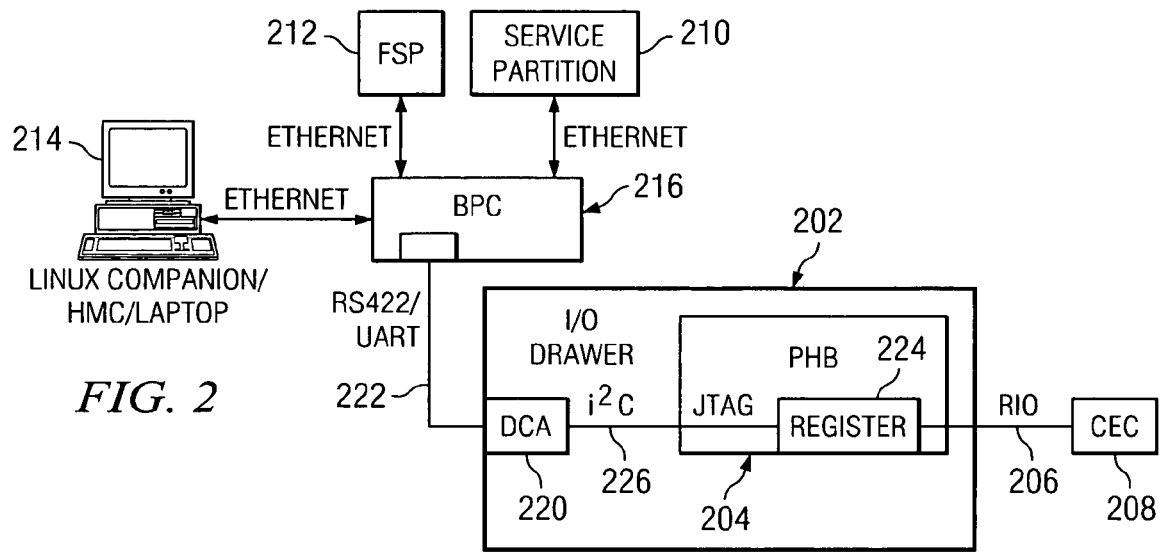
FIG. 2 is a block diagram of a system providing an alternative path for monitoring remote I/O drawers in accordance with a preferred embodiment of the present invention.

With reference now to FIG. 2, a block diagram of a system providing an alternative path for monitoring remote I/O drawers is depicted in accordance with a preferred embodiment of the present invention. The components in FIG. 2 may be implemented in data processing system 100 in FIG. 1.

I/O drawer 202 contains one PCI host bridge (PHB) 204. However, although FIG. 2 is depicted with one I/O drawer 202 and one PHB 204, one skilled in the art will recognize that more I/O drawers and PHBs may be included than depicted in FIG. 2. Each PHB may support, for example, between 4 to 8 PCI expansion slots, which may be implemented, for example, as I/O adapter 136 in FIG. 1.

In existing systems, RIO link 206 may be used to connect central electronics complex (CEC) 208 to I/O drawer 202. As CEC 208 comprises one or more system processors and memory, these RIO links provide the communication path from the processors in the CEC to the I/O drawers.

However, as illustrated in FIG. 2, a communications path provided by the bulk power controller 216 is used to monitor chip performance registers on the I/O drawer. In the illustrative example, various components, such as service partition 210, flexible service processor (FSP) 212, and service console 214, are allowed to read and write to chip performance registers on the drawer. As shown, service console 214 may comprise, for example, a Linux companion system, a Hardware Management Console (HMC), or a laptop, each of which enable a system administrator to monitor system 200 for hardware problems, although other systems may be used to implement the features of the present invention.

Service partition 210, FSP 212, and service console 214 may access the chip performance registers on the I/O drawer via bulk power controller 216. A connection interface, such as an ethernet interface or System Power Control Network (SPCN) interface, may be used to connect service partition 210, FSP 212, and service console 214 to bulk power controller 216. System 200 uses service partition 210, FSP 212, and service console 214 to login to bulk power controller 216. As bulk power controller 216 is connected to I/O drawer 202, service partition 210, FSP 212, and service console 214 may then send commands to I/O drawer 202.

System 200 send commands to distributed converter assembly (DCA) 220 within I/O drawer 202 using RS422/UART connection 222, which connects bulk power controller 216 to DCA 220. RS422 is an Electronic Industries Alliance specification that deals with data communication. DCA 220 is plugged directly into I/O drawer 202 and receives power from bulk power controller 216. DCA 220 converts the power and supplies precise voltages required by the logic and memory circuitry of the I/O drawer. Within I/O drawer 202, DCA 220 includes an I²C path to the chip registers on the drawer. System may use I²C connection 226 to access chip register 224.

As the chip performance registers are accessible to the system through the alternative path, system 200 may monitor I/O performance in a non-invasive manner. System 200 may obtain information regarding system's performance in handling transactions, including transaction processing times, error messages generated, and the like. Information obtained from using the alternative path may then be analyzed to determine whether system operation meets performance requirements. As the alternative path allows system 200 access to performance registers on the drawer without using the RIO bus, performance information may be obtained without impacting system performance.

Figure 3:
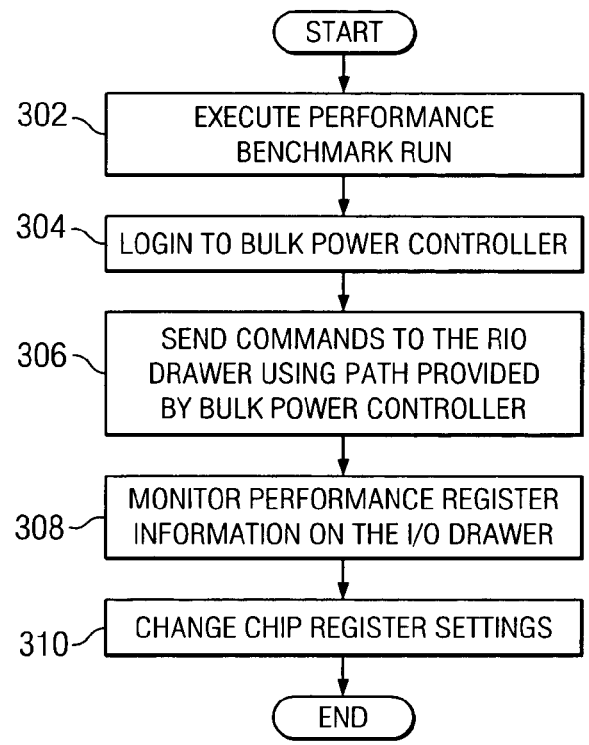
FIG. 3 is a flowchart of a process for monitoring I/O performance without using the RIO bus in accordance with a preferred embodiment of the present invention.

FIG. 3 is a flowchart of a process for monitoring I/O performance without using the RIO bus in accordance with a preferred embodiment of the present invention. The process described in FIG. 3 may be implemented in a data processing system, such as data processing system 100 shown in FIG. 1.

The process begins with executing a performance benchmark run (step 302). During the performance benchmark run, a tester may use either the system or a separate workstation to login to the bulk power controller (step 304). Once the system is logged into the bulk power controller, the system may use the alternative path provided by the bulk power controller to send commands to the remote I/O drawer (step 306), without having to use the path provided by the RIO cables. The tester may use the alternative path provided by the bulk power controller to monitor the performance register information on the I/O drawer (step 308), without having to use the path provided by the RIO cables. In this manner, register information on the I/O drawers may be accessed without creating additional RIO traffic.

To gain additional performance, software may be written to monitor I/O performance for a load imbalance. As certain initialization registers will handle different kinds of load more efficiently based on settings in the registers, the software may dynamically balance the load by using the alternate path of the present invention to change the chip register settings (step 310), thus increasing system performance.

Thus, the present invention provides an alternative path to access chip performance registers in remote I/O drawers. In systems that do not have JTAG access to remote drawers and only use RIO paths to monitor I/O performance, sending transactions using the RIO paths increases the traffic on the RIO bus, and thereby negatively affect system performance. In contrast, the mechanism of the present invention allows for monitoring I/O performance without using the RIO bus. Using the alternate path provided by the bulk power controller, a tester is able, through the system itself or a separate workstation, to read and write to the chip performance registers on the I/O drawer. The present invention provides an advantage of allowing a system to monitor I/O performance in a non-invasive manner and not affect system performance. Another advantage provided by the present invention is that dynamic tuning and load balancing may be performed by setting chip registers during runtime. This process allows all of the RIO traffic to be used by the performance benchmark programs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring input/output performance in a data processing system, comprising:
executing a performance benchmark run on the data processing system with a remote input/output drawer;
logging onto a bulk power controller in response to executing the performance benchmark run, wherein the bulk power controller provides a communications path between the data processing system and the remote input/output drawer, and wherein the communications path allows the data processing system to access chip register information on the remote input/output drawer without using a remote input/output link; and
obtaining the chip register information and monitoring input/output performance using the communications path.

2. The method of claim 1, further comprising:
detecting a load imbalance; and
dynamically balancing a load by changing settings within a chip register using the communications path.

3. The method of claim 2, wherein the chip register is an initialization register.

4. The method of claim 2, wherein changing the settings in the chip register allows chip logic to handle the load more efficiently.

5. The method of claim 1, wherein the chip registers include JTAG-accessible registers.

6. The method of claim 1, wherein the communications path allows the data processing system to monitor input/output performance when a remote input/output link is broken.

7. The method of claim 1, wherein the communications path includes an $I^2C$ link.

8. The method of claim 1, wherein one of an ethernet interface or System Power Control Network interface is used to connect the data processing system to the bulk power controller.

9. The method of claim 1, wherein the bulk power controller is connected to a distributed converter assembly within the remote input/output drawer using a RS422/UART link.

10. The method of claim 1, wherein the data processing system sends commands to the distributed converter assembly using the RS422/UART link.

11. A data processing system for monitoring input/output performance in a data processing system, comprising:
executing means for executing a performance benchmark run on the data processing system with a remote input/output drawer;
logging means for logging onto a bulk power controller in response to executing the performance benchmark run, wherein the bulk power controller provides a communications path between the data processing system and the remote input/output drawer, and wherein the communications path allows the data processing system to access chip register information on the remote input/output drawer without using a remote input/output link; and
obtaining means for obtaining the chip register information and monitoring input/output performance using the communications path.

12. The data processing system of claim 11, further comprising:
detecting means for detecting a load imbalance; and
balancing means for dynamically balancing a load by changing settings within a chip register using the communications path.

13. The data processing system of claim 12, wherein the chip register is an initialization register.

14. The data processing system of claim 12, wherein changing the settings in the chip register allows chip logic to handle the load more efficiently.

15. The data processing system of claim 11, wherein the chip registers include JTAG-accessible registers.

16. The data processing system of claim 11, wherein the communications path allows the data processing system to monitor input/output performance when a remote input/output link is broken.

17. The data processing system of claim 11, wherein the communications path includes an $I^2C$ link.

18. The data processing system of claim 11, wherein one of an ethernet interface or System Power Control Network interface is used to connect the data processing system to the bulk power controller.

19. The data processing system of claim 11, wherein the bulk power controller is connected to a distributed converter assembly within the remote input/output drawer using a RS422/UART link.

20. The data processing system of claim 11, wherein the data processing system sends commands to the distributed converter assembly using the RS422/UART link.

21. A computer program product in a computer readable medium for monitoring input/output performance in a data processing system, the computer program product comprising:
    first instructions for executing a performance benchmark run on the data processing system with a remote input/output drawer;
    second instructions for logging onto a bulk power controller in response to executing the performance benchmark run, wherein the bulk power controller provides a communications path between the data processing system and the remote input/output drawer, and wherein the communications path allows the data processing system to access chip register information on the remote input/output drawer without using a remote input/output link; and
    third instructions for obtaining the chip register information and monitoring input/output performance using the communications path.

22. The computer program product of claim 21, further comprising:
    fourth instructions for detecting a load imbalance; and
    fifth instructions for dynamically balancing a load by changing settings within a chip register using the communications path.

23. The computer program product of claim 22, wherein the chip register is an initialization register.

24. The computer program product of claim 22, wherein changing the settings in the chip register allows the chip logic to handle the load more efficiently.

25. The computer program product of claim 21, wherein the chip registers include JTAG-accessible registers.

26. The computer program product of claim 21, wherein the communications path allows the data processing system to monitor input/output performance when a remote input/output link is broken.

27. The computer program product of claim 21, wherein the communications path includes an $I^2C$ link.

28. The computer program product of claim 21, wherein one of an ethernet interface or System Power Control Network interface is used to connect the data processing system to the bulk power controller.

29. The computer program product of claim 21, wherein the bulk power controller is connected to a distributed converter assembly within the remote input/output drawer using a RS422/UART link.

30. The computer program product of claim 21, wherein the data processing system sends commands to the distributed converter assembly using the RS422/UART link.

31. A data processing system for monitoring input/output performance in a data processing system, comprising:
    a remote input/output drawer;
    a bulk power controller, wherein the bulk power controller provides a communications path between the data processing system and the remote input/output drawer, and wherein the communications path allows the data processing system to access chip register information on the remote input/output drawer without using a remote input/output link; and
    a service processor, wherein the service processor logs onto the bulk power controller in response to executing a performance benchmark run on the data processing system with the remote input/output drawer, and wherein the service processor obtains the chip register information and monitors input/output performance using the communications path.

32. The data processing system of claim 31, wherein the service processor, responsive to detecting a load imbalance, dynamically balances a load by changing settings within a chip register using the communications path.

* * * * *